(12) United States Patent
Nam et al.

(10) Patent No.: US 9,603,152 B2
(45) Date of Patent: Mar. 21, 2017

(54) WIRELESS NETWORK CHANNEL ALLOCATION METHOD FOR INTERFERENCE AVOIDANCE

(75) Inventors: Tae Sik Nam, Hwaseong (KR); Hoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 534 days.

(21) Appl. No.: 13/332,796

(22) Filed: Dec. 21, 2011

(65) Prior Publication Data

US 2012/0230263 A1    Sep. 13, 2012

(30) Foreign Application Priority Data

Mar. 8, 2011    (KR) .................. 10-2011-0020483

(51) Int. Cl.
    *H04W 16/14*    (2009.01)
    *H04W 72/08*    (2009.01)
    *H04W 36/06*    (2009.01)

(52) U.S. Cl.
    CPC .......... *H04W 72/082* (2013.01); *H04W 16/14* (2013.01); *H04W 36/06* (2013.01)

(58) Field of Classification Search
CPC ........ H04W 16/14; H04W 92/02; H04B 7/26; H04L 27/2601; H04J 11/00
See application file for complete search history.

(56) References Cited

U.S. PATENT DOCUMENTS

| | | | | |
|---|---|---|---|---|
| 5,418,839 | A * | 5/1995 | Knuth et al. ............... | 455/464 |
| 6,477,389 | B1 * | 11/2002 | Kim .................. | H04B 17/13 |
| | | | | 455/450 |
| 6,941,143 | B2 * | 9/2005 | Mathur ................ | 455/452.1 |
| 8,031,629 | B2 * | 10/2011 | Stegmaier et al. ......... | 370/254 |
| 8,270,910 | B2 * | 9/2012 | Picard ................ | 455/69 |
| 2001/0041537 | A1 * | 11/2001 | Simonsson et al. ........ | 455/67.1 |
| 2002/0087347 | A1 * | 7/2002 | Mano ................ | G06Q 30/06 |
| | | | | 705/80 |
| 2003/0219002 | A1 * | 11/2003 | Kishida ................ | 370/338 |
| 2004/0190460 | A1 * | 9/2004 | Gaskill ................ | 370/254 |
| 2004/0259589 | A1 * | 12/2004 | Bahl et al. ............... | 455/553.1 |
| 2005/0239497 | A1 * | 10/2005 | Bahl et al. ............... | 455/552.1 |
| 2005/0265273 | A1 * | 12/2005 | Karabinis et al. ........ | 370/316 |
| 2007/0083624 | A1 * | 4/2007 | Soomro ................ | 709/223 |
| 2007/0220109 | A1 * | 9/2007 | Nelson et al. ............ | 709/218 |
| 2007/0288950 | A1 * | 12/2007 | Downey et al. .......... | 725/9 |

(Continued)

*Primary Examiner* — Hassan Phillips
*Assistant Examiner* — Prenell Jones (57) ABSTRACT

A wireless network channel allocation method for interference avoidance in a wireless network includes determining whether some or all of the one or more channels are used by other sources, if some or all of the one or more channels are used by other sources, determining whether one of channels used by other sources is currently used by the wireless network, if one of the channels used by other sources is currently used by the wireless network, switching the channel currently used by the wireless network to any one of the one or more channels except for the channel currently used by the wireless network, and if one of the channels used by other sources is not currently used by the wireless network, storing information about the channels used by the other sources, wherein the switched channel is a channel which is not most recently used by other sources according to the stored information.

14 Claims, 6 Drawing Sheets

(56) References Cited

U.S. PATENT DOCUMENTS

| | | | |
|---|---|---|---|
| 2008/0112340 A1* | 5/2008 | Luebke | 370/310 |
| 2008/0130715 A1* | 6/2008 | Gorday et al. | 375/146 |
| 2008/0137620 A1* | 6/2008 | Wang et al. | 370/337 |
| 2009/0006276 A1* | 1/2009 | Woolston | G06Q 30/0212 705/400 |
| 2010/0085882 A1* | 4/2010 | Yamada | 370/252 |
| 2010/0269120 A1* | 10/2010 | Manttari et al. | 719/313 |
| 2010/0291921 A1* | 11/2010 | Ruuska et al. | 455/426.1 |
| 2011/0069720 A1* | 3/2011 | Jacobs et al. | 370/466 |
| 2011/0128902 A1* | 6/2011 | Guo | 370/312 |
| 2011/0176465 A1* | 7/2011 | Panta et al. | 370/311 |
| 2011/0205956 A1* | 8/2011 | Inada | 370/315 |
| 2011/0211826 A1* | 9/2011 | Leclair et al. | 398/25 |
| 2011/0249598 A1* | 10/2011 | Horvat et al. | 370/280 |
| 2011/0317632 A1* | 12/2011 | Bahl et al. | 370/329 |
| 2012/0026970 A1* | 2/2012 | Winters et al. | 370/330 |
| 2012/0039284 A1* | 2/2012 | Barbieri et al. | 370/329 |
| 2012/0294168 A1* | 11/2012 | Freda et al. | 370/252 |
| 2014/0023023 A1* | 1/2014 | Jeon et al. | 370/329 |

\* cited by examiner

WIRELESS NETWORK CHANNEL ALLOCATION METHOD FOR INTERFERENCE AVOIDANCE

CROSS-REFERENCE TO RELATED APPLICATIONS

This application claims the priority benefit of Korean Patent Application No. 2011-0020483, filed on Mar. 8, 2011 in the Korean Intellectual Property Office, the disclosure of which is incorporated herein by reference.

BACKGROUND

1. Field

Embodiments relate to a wireless network communication channel allocation method to avoid interference generated during communication in the wireless network.

2. Description of the Related Art

As numerous wireless devices have been introduced, wireless devices to be used may be subject to interference by other communication networks or devices generating electromagnetic waves, such as microwave ovens etc. Such communication interference is a factor deteriorating communication performance of wireless devices.

A ZIGBEE network (IEEE 802.15.4) used mainly in a control-based application is subject to severe performance deterioration when it uses not only the same frequency bands as frequency bands used by a Wireless Local Area Network (WLAN) (IEEE 802.11 b/g/n) and a microwave oven but also frequency bands adjacent thereto. To avoid such interference, a method to avoid a time zone during which an interference source performs communication or a method to avoid a frequency band used by the interference source may be used.

A conventional method to avoid a communication time zone has problems of performance deterioration such as increased communication latency when the interference source occupies a channel for a long time.

A conventional method to avoid a frequency band used by the interference source includes a method to select a channel farthest from a currently used channel to avoid interference during channel allocation. Even though such a method is easily implemented due to simple channel selection without considering current wireless communication states and characteristics of an interference source, frequent channel switching is required when a large number of interference sources is present.

SUMMARY

Therefore, it is an aspect to provide a wireless network channel allocation method for interference avoidance by performing channel switching considering current wireless environments and noise patterns when there is a need to switch a currently used channel to a new channel due to interference.

Additional aspects will be set forth in part in the description which follows and, in part, will be obvious from the description, or may be learned by practice of the invention.

In accordance with one aspect, a wireless network channel allocation method for interference avoidance in a wireless network which performs communication between devices in a predetermined frequency band including one or more channels includes determining whether some or all of the one or more channels are used by other sources, if some or all of the one or more channels are used by other sources, determining whether one of the one or more channels used by other sources is currently used by the wireless network, if one of the one or more channels used by other sources is currently used by the wireless network, switching the channel which is currently used by the wireless network to any one of the one or more channels except for the channel which is currently used by the wireless network, and if one of the one or more channels used by other sources is not currently used by the wireless network, storing information about the channels used by the other sources, wherein the switched channel is a channel which is not most recently used by other sources according to the stored information.

The determining of whether some or all of the one or more channels are used by other sources may include sensing an energy value variation of each of the one or more channels at a prescribed period, if a channel, energy value variation of which is equal to or greater than a predetermined value, is sensed, determining that the channel, energy value variation of which is equal to or greater than the predetermined value, is used by other sources, and if a channel, energy value variation of which is less than the predetermined value, is sensed, determining that the channel, energy value variation of which is less than the predetermined value, is not used by other sources.

The determining of whether one of the one or more channels used by other sources is currently used by the wireless may be performed through determination as to whether a response to a communication frame between devices communicating in the wireless network is present.

The prescribed period may be determined according to characteristics of devices communicating in the wireless network.

The prescribed period may vary according to variation in the number of channels having the energy value variation equal to or greater than the predetermined value.

The storing of information about the channels used by the other sources may include storing an order of occurrence of one or more channels used by the other sources.

The determination as to whether a response to a communication frame between devices communicating in the wireless network is present may include determining whether an Acknowledgement (ACK) signal which is generated in response to a transmission frame of the communication frame between the devices is transmitted.

The determining of whether an Acknowledgement (ACK) signal is transmitted may include if the number of non-transmissions of the ACK signal is equal to or greater than a predetermined number, determining that one of channels used by other sources is currently used by the wireless network, and if the number of non-transmissions of the ACK signal is less than the predetermined number, determining that channels used by other sources are not currently used by the wireless network.

The stored information about the channels used by the other sources may be times when the one or more channels are used by frequency bands used by other sources, and wherein the switched channel is a channel which is not most recently used by other sources based on the stored information about the channels.

The stored information about the channels may be channel numbers of channels used by other sources.

The channel numbers may be stored in a stack form while being added to a top of a stack in an order of use time of each channel.

The channel numbers may be stacked such that channels which are most recently used by other sources are stacked to a top side of the stack and channels which have least recently been used by other sources are stacked to a bottom side of the stack.

The switched channel may be a channel which is located at the bottommost among channel numbers stored in the stack.

The wireless network may perform communication through a ZIGBEE communication protocol.

Through the wireless network channel allocation method for interference avoidance according to an aspect, communication environments are periodically monitored so that channels used by interference sources may be discerned and rapid channel switching may be performed during interference. Furthermore, channels which are not to be used not only currently but also in the future may be selected and the number of channel switchings may be decreased.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
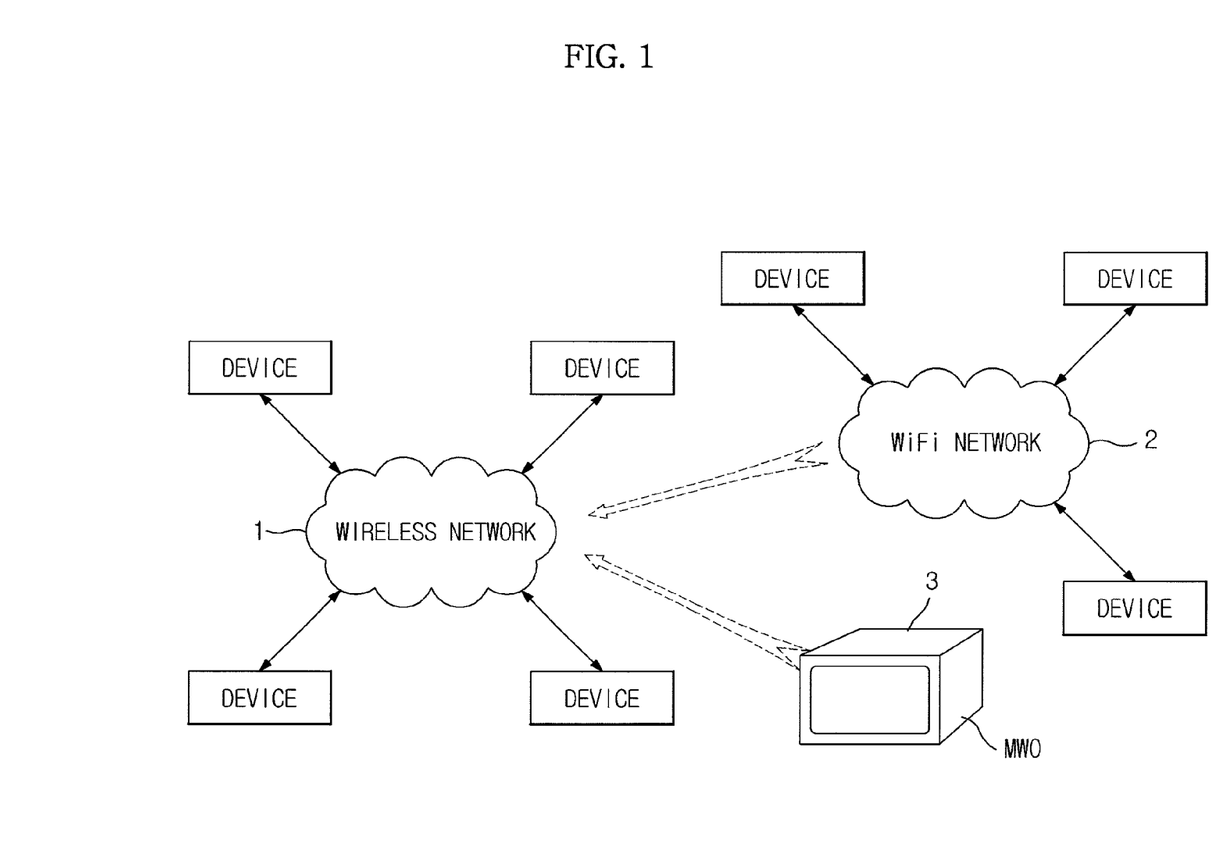
FIG. 1 is a schematic diagram illustrating occurrence of interference in a wireless network due to other sources according to an exemplary embodiment.

FIG. 1 is a schematic diagram illustrating occurrence of interference in a wireless network due to other sources according to an exemplary embodiment.

A variety of devices accesses a wireless network to perform wireless communication. For wireless communication, a prescribed communication network should be present and the prescribed communication network should be capable of performing communication in a frequency band of a prescribed range.

A wireless network 1 to be used may be subject to interference by other wireless networks or electronic devices because multiple networks or electronic devices use limited frequency bands.

The wireless network 1 shown in FIG. 1 may be a ZIGBEE communication network, a WIFI communication network, a BLUETOOTH communication network, etc. Another wireless network 2 which may interfere with the wireless network 1 may be not only a WIFI communication network as shown but also a ZIGBEE communication network, a BLUETOOTH communication network, a mobile communication network, etc. The wireless network 2 shown in FIG. 1 is a WIFI network.

Devices which may interfere with the wireless network 1 include electronic devices, for example, a microwave oven (MWO) 3 as shown in FIG. 1.

According to an exemplary embodiment, the wireless network 1 may use a ZIGBEE communication protocol. Hereinafter, a device or a network which may interfere with the wireless network 1 using the ZIGBEE communication protocol will be described.

Typical devices using a frequency band similar to a 2.4 GHz Industrial, Scientific Medical (ISM) band which is a frequency band used by a ZIGBEE device are as follows: smart phones, tablet PCs, notebook PCs, WIFI (802.11 b/g/n) used in Voice over Internet Protocol (VoIP), headsets, BLUETOOTH used in hands-free headsets, and microwave ovens used for cooking.

Among these, BLUETOOTH uses a Frequency Hopping Spread Spectrum (FHSS) scheme that performs communication while continuously switching channels.

In the case of WIFI, a Direct Sequence Spread Spectrum (DSSS) or Orthogonal Frequency-Division Multiplexing (OFDM) scheme is used. Unlike BLUETOOTH, WIFI uses a preset channel unless a user forcibly switches the channel. BLUETOOTH has a bandwidth of 1 MHz per channel, whereas WIFI has a wide bandwidth of 22 MHz/40 MHz per channel.

A microwave oven has a fixed center frequency of 2.45 GHz.

As noted above, wireless devices except for BLUETOOTH perform communication without frequently switching channels and BLUETOOTH performs communication using relatively low output power. When comparing WIFI, a microwave oven, and BLUETOOTH with one another, since BLUETOOTH operates at the lowest output power and the microwave oven operates at the highest output power, BLUETOOTH causes the least interference. Accordingly, even though only the other interference sources except for BLUETOOTH are considered when it is desired to solve an interference problem of the wireless network 1 to be used, sufficient performance improvement may be expected.

Wireless devices and services using a 2.4 GHz ISM band include devices and services using WIFI, such as smart phones, tablet PCs, PCs supporting Digital Living Network Association (DLNA), TVs, phones, etc. Such devices and services may create interference with ZIGBEE communication.

A method to avoid interference of the above-mentioned communication devices and networks will be described hereinbelow with reference to FIGS. 2 to 6.

As a general method to avoid an interference phenomenon caused by an external source, a method to switch a currently used channel at which interference is generated by an external source to one of arbitrary other channels is used. Since this method considers only a time point when interference is generated, if interference is again generated later, a used channel should be switched again, thereby increasing the number of channel switchings.

To solve such a problem, a wireless network channel allocation method for interference avoidance according to an exemplary embodiment discerns a possibility of interference with other sources even in the case where a channel currently used by the wireless network 1 is not subject to interference in addition to in the case where the currently used channel is subject to interference. That is, whether interference is generated by an external source is considered not only at a currently used channel but also at channels which are not currently used so that a channel used by the wireless network 1 may be switched by incorporating characteristics of a previously considered channel when the channel is subject to interference.

Figure 2:
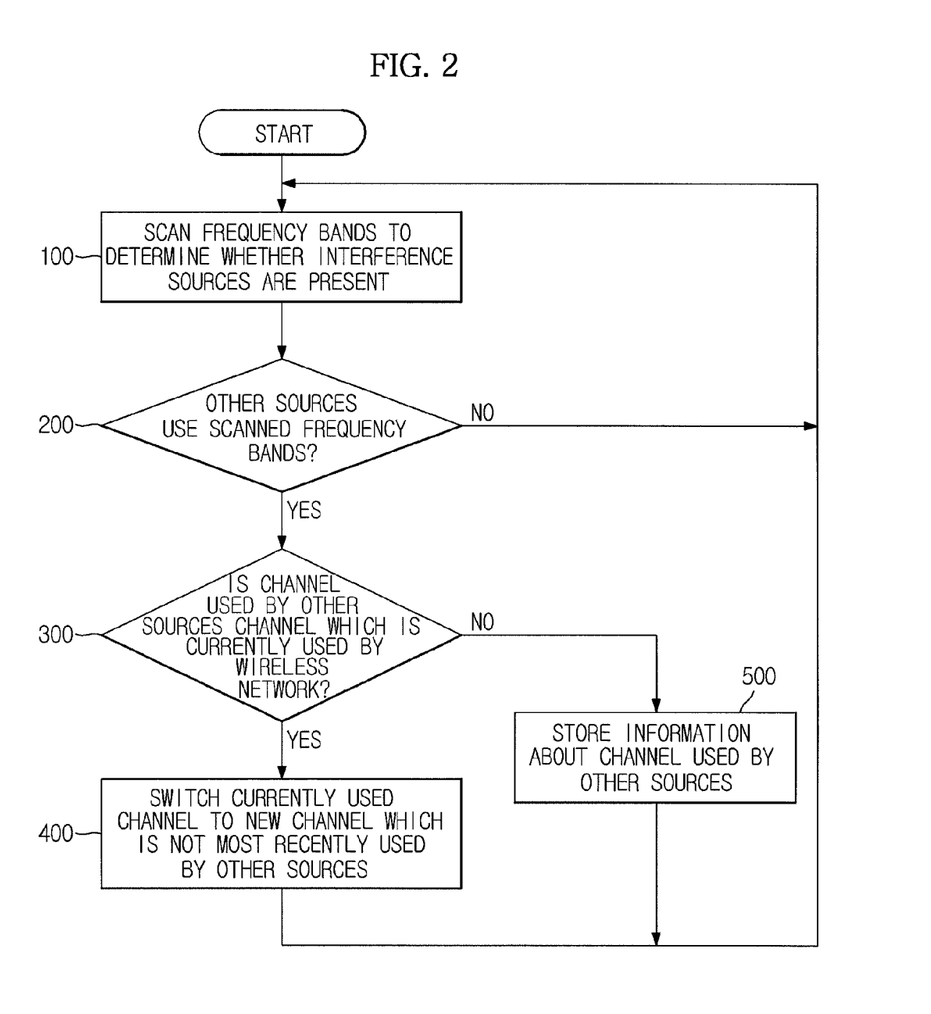
FIG. 2 is a flowchart illustrating a wireless network channel allocation method for interference avoidance according to an exemplary embodiment.

FIG. 2 is a flowchart illustrating a wireless network channel allocation method for interference avoidance according to an exemplary embodiment.

First, frequency bands are scanned to determine whether an interference source which has an effect on the wireless network 1 is present (operation 100). One of various methods to scan frequency bands includes a method to scan all channels at a prescribed period and to detect channels according to whether an energy value during scanning of each channel is above a predetermined value.

Next, whether other sources use the scanned frequency bands is determined (operation 200). One of various methods to determine whether other sources use the scanned frequency bands includes a method of sensing use of other sources through an energy value of each of the scanned frequency bands or channels. This will be described in detail with reference to FIG. 3 later.

Thereafter, whether a channel used by other sources is a channel which is being used by the wireless network 1 is determined (operation 300). If not, information about the channel used by other sources is stored in a memory in order to use the channel during later channel allocation (operation 500). The stored information about the channel includes a channel number, use time (order), or information about other sources using a corresponding channel. After the information about the channel used by other sources is stored in the memory, the frequency bands are scanned according to a prescribed period until interference with the channel which is being used by the wireless network 1 is generated (returning to operation 100).

If the channel used by other sources is a channel which is being used by the wireless network 1, since it is determined that the currently used channel interferes with other sources, the currently used channel is switched to another channel which is not subject to interference. That is, a channel which is not most recently used by other sources is allocated as a new channel, based on channel information indicating whether a channel is used by other sources (operation 400).

The reason a channel which is not most recently used by other sources is selected is that the channel has a high probability of not being used by other sources not only currently but also in the future. Namely, most interference sources except for BLUETOOTH have a characteristic of continuing to use one channel unless a user forcibly sets a new channel. Such a characteristic is referred to as frequency locality. Thereafter, communication is performed through a newly allocated channel and a frequency band is scanned to determine whether other sources which may cause interference are present (returning to operation 100).

Figure 3:
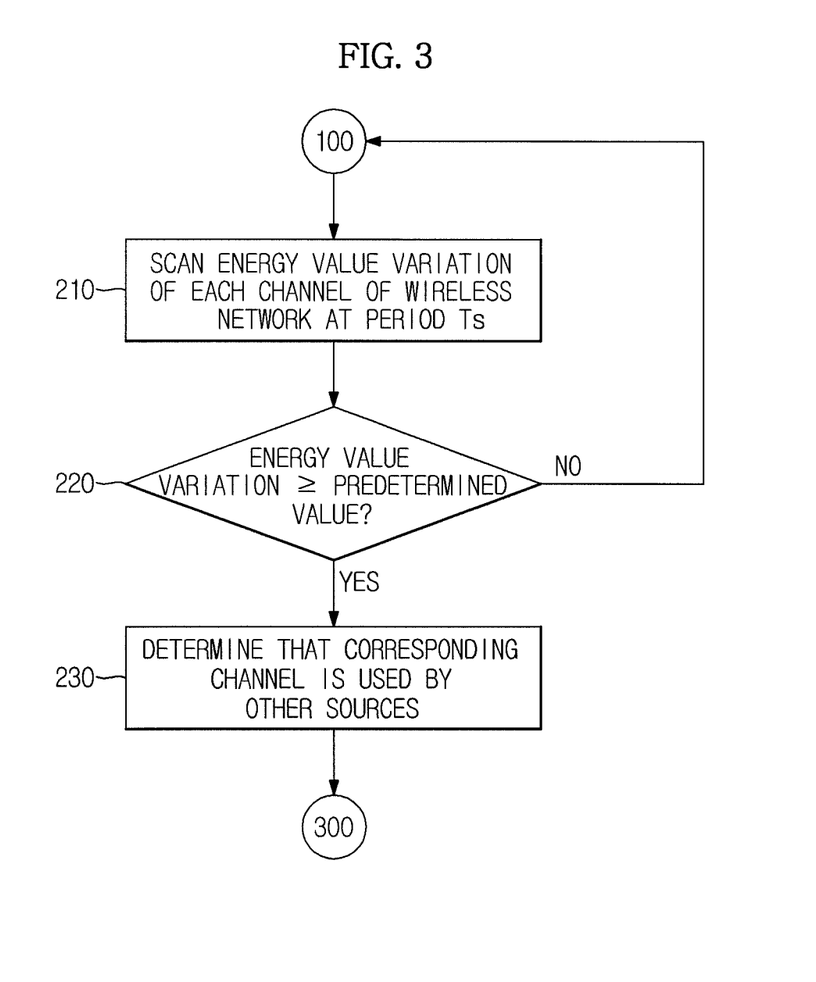
FIG. 3 is a flowchart illustrating in detail a determination process as to whether some or whole of one or more channels are used by other sources according to an exemplary embodiment.

The operation of determining whether other sources use the scanned frequency bands, which has been described with reference to FIG. 2, may be implemented in various ways. The determination method according to an exemplary embodiment is shown in FIG. 3. FIG. 3 is a flowchart illustrating in detail a determination process as to whether some or all of one or more channels are used by other sources according to an exemplary embodiment.

First, in order to determine whether one or more channels included in the wireless network 1 interfere with frequency bands used by other sources, an energy value variation of each of the channels of the wireless network 1 is scanned at a prescribed period Ts (operation 210). The scanning of the energy value variation uses Energy Detection (ED) scanning. Channels scanned using ED, scanning may include not only a channel currently used by the wireless network 1 but also all channels included in the wireless network 1.

Next, it is determined whether an energy value or an energy variation value sensed through the scanning is equal to or greater than a predetermined value (operation 220). If the energy value or the energy value variation of a channel is less than the predetermined value, it is determined that the wireless network 1 does not interfere with other sources and the procedure returns to operation 100 shown in FIG. 2 to scan a frequency band. However, if the energy value or the energy value variation of a channel is equal to or greater than the predetermined value, it is determined that the corresponding channel is used by other sources (operation 230) and the procedure proceeds to operation 300 shown in FIG. 2.

ZIGBEE, for example; includes 16 channels in a 2.4 GHz ISM band and one channel may be used for communication. It is monitored which channel is used by other sources by sequentially scanning 16 channels at periods, including not only a currently communicating channel not also the other channels.

Although the exemplary embodiment defines a scan period Ts to perform scanning channel by channel, it is possible to simultaneously scan all channels and to increase the scan period Ts in consideration of characteristics of a ZIGBEE chip. If a value higher than a threshold value which is a predefined predetermined value is sensed during ED scan, it may be determined that a corresponding frequency band (channel) is used by other sources. If the channel used by other sources is a channel which is being used by the wireless network 1, it may be determined that a corresponding channel interferes with other sources or, for more accurate interference detection, an interference detection count may be increased by one. If the interference detection count used to more accurately perform interference detection is equal to or greater than a predetermined value, it may be determined that a corresponding channel interferes with other sources. If the channel which is determined to be a channel currently used by other sources is not a channel which is being used by the wireless network 1, times (orders) of respective channels used by other sources are recorded.

If a low threshold value compared with the energy value variation is selected, since weak noise is considered to determine whether a channel is used by other sources, a channel may be rapidly switched. However, there are disadvantages of frequently switching channels even when weak noise under which communication may be performed is present. Meanwhile, if a high threshold value is selected, since only strong noise is considered, the number of channel switchings is reduced. However, in some cases, it is difficult to rapidly cope with interference.

As described above, channels are scanned at a predetermined period Ts in order to discern frequency locality of other interference sources. However, periodic scanning of channels may cause additional overhead.

Although the scan period Ts may simply be used as a fixed value, if a scanned result is uniform or partially varies only in a channel in which a possibility of interference is low, it may be determined that a current network environment is stable by extending frequency characteristics.

In order to reduce overhead in such a case, it is possible to infrequently scan channels by increasing the scan period Ts and to frequently scan channels by decreasing the scan period Is when a significant variation is sensed during channel scanning. In other words, a scanning period may be decreased only when scan is needed, thereby sensing a channel variation with accuracy. An increase/decrease in the width of the scan period Ts is determined according to a communication protocol of the wireless network 1 or a device characteristic of the wireless network 1.

The scan period Ts may be determined according to variation in the number of channels, scanned energy value variation of which is equal to or greater than a predetermined value. That is, under the state that it is determined that any one channel among one or more channels included in the wireless network 1 is used by other sources, if it is determined that another channel scanned during the next scan period is used by other sources, since a total of two channels are used by other sources, the channels of the wireless network 1 may be scanned by decreasing the period Ts to accurately determine interference detection.

Figure 5:
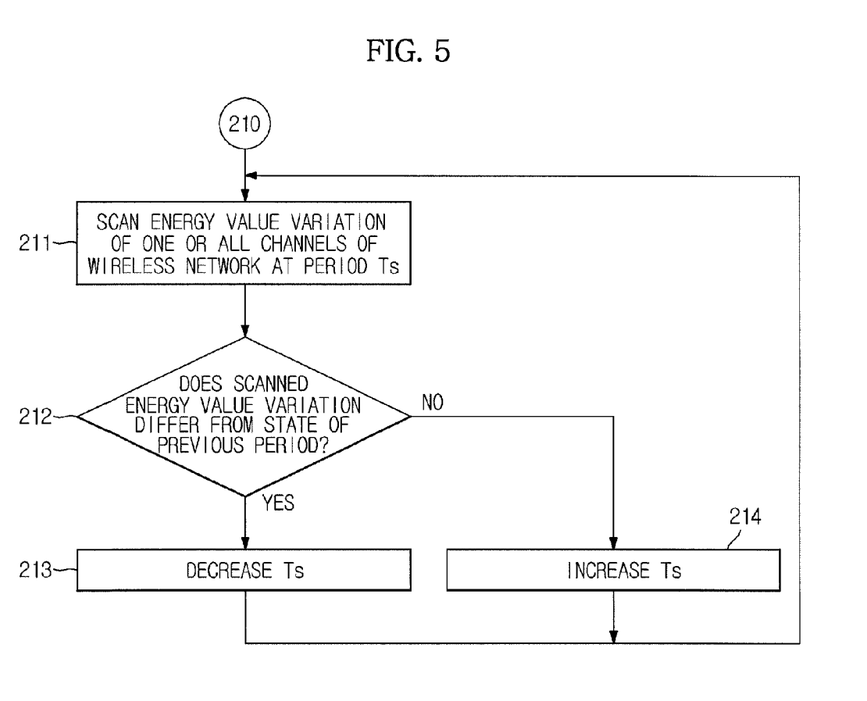
FIG. 5 is a flowchart illustrating a variation process of the period Ts shown in FIG. 3 according to an exemplary embodiment.

The scan period Ts may be appropriately adjusted according to network environments and this will be described with reference to FIG. 5. FIG. 5 is a flowchart illustrating a variation process of the period Ts shown in FIG. 3 according to an exemplary embodiment.

First, an energy value variation of one channel or all channels included in the wireless network 1 is scanned at a predetermined period (operation 211). Whether the scanned energy value variation differs from a state of a previous period is determined in operation 212. This is to determine whether a significant variation occurs in a channel while scanning the channel at a fixed period. If significant variation occurs, more precise scanning is performed.

If the energy value variation of a channel sensed through scanning differs from a state of a previous period, since it is determined that other sources use some frequency bands of the wireless network 1, a scan period Ts is decreased to precisely sense the energy value variation (operation 213). If the energy value variation of a channel sensed through scanning does not differ from a state of a previous period, since it is determined that there is no variation in information about time (order) used by other sources, stored in the memory, the scan period Ts is increased to reduce channel scanning overhead (operation 214). After adjusting the scan period, the energy value variation of a channel of the wireless network 1 is scanned at the adjusted scan period (returning to operation 211).

Figure 4:
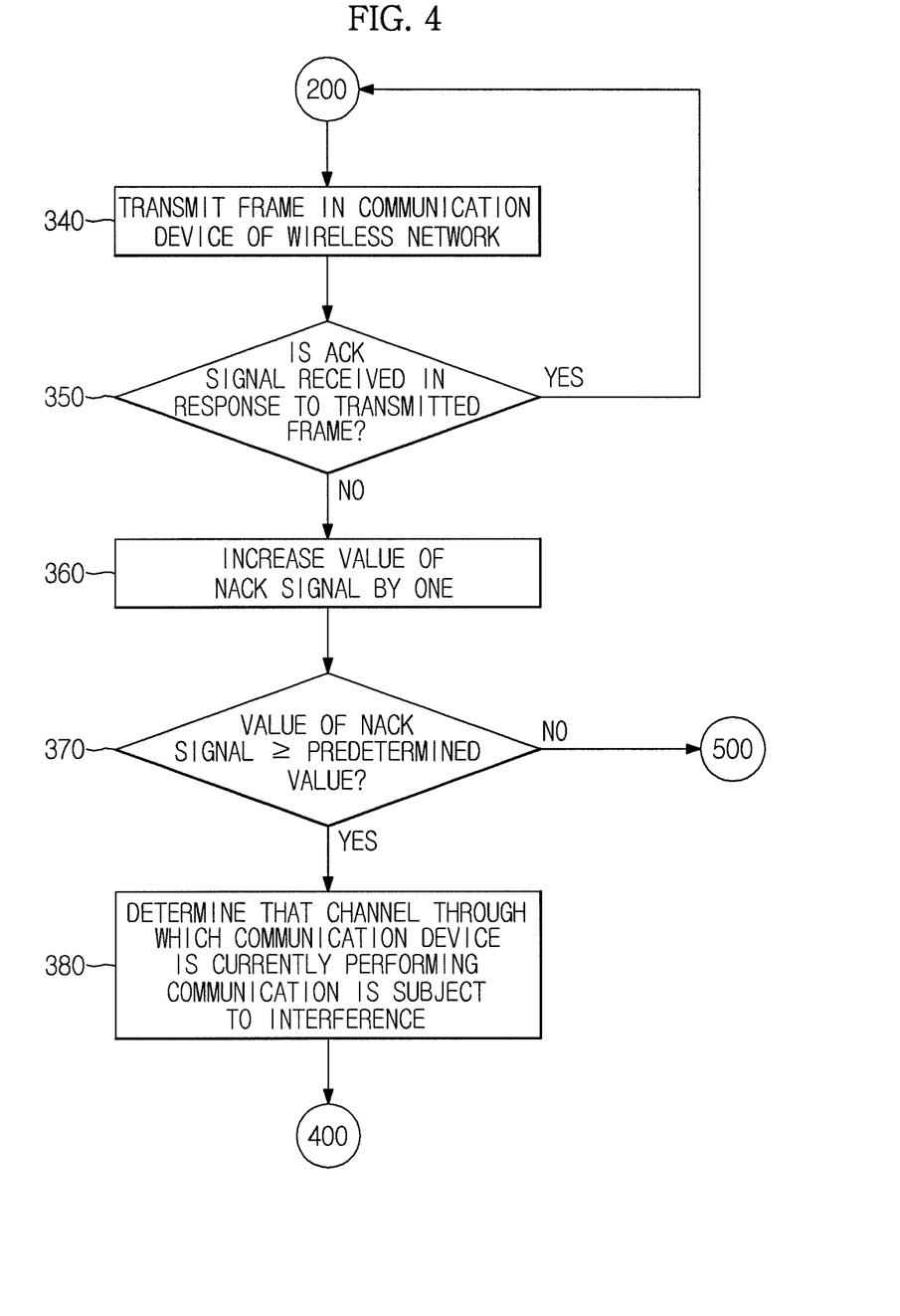
FIG. 4 is a flowchart illustrating in detail a determination process as to whether a channel used by other sources is being used in a wireless network according to an exemplary embodiment.

Next, a determination process to determine whether a channel used by other sources is being used in a wireless network by checking whether an Acknowledgement (ACK) signal is received in response to a frame transmitted and received between devices of the wireless network 1 is received will be described. FIG. 4 is a flowchart illustrating in detail a determination process as to whether a channel used by other sources is being used in a wireless network according to an exemplary embodiment.

First, a communication device connected to the wireless network 1 transmits a frame (operation 340). An additional frame may be used to detect interference or a general data frame used to implement each network function may be used. An ACK signal refers to a signal to confirm whether a frame transmitted and received through the wireless network 1 has been correctly transmitted and received. Next, whether the ACK signal is correctly received in response to a transmitted frame is determined (operation 350). That is, if a transmission device transmits one frame through a channel of the wireless network 1, a reception device receives the frame and transmits the ACK signal indicating that the frame has been accurately received. If the transmission device receives the ACK signal, it indicates that a channel communicating through the wireless network 1 does not interfere with other sources.

If the transmission device does not receive the ACK signal, a value of a Negative ACK (NACK) signal indicating that the ACK has been abnormally received is increased by one (operation 360). If the transmission device normally receives the ACK signal, since a corresponding channel does not interfere with other sources, the procedure proceeds to operation 200 in which information of channels used by other sources is stored.

Next, whether the increased value of the NACK signal is equal to or greater than a predetermined value is determined (operation 370). If the value of the NACK signal is greater than or equal to the predetermined value, since communication through a corresponding channel is not normal, it is determined that a channel through which a communication device is currently performing communication is subject to interference (operation 380). If the value of the NACK signal is less than the predetermined value, since communication through a corresponding channel is normal or interference caused by other sources is negligible, the procedure goes to operation 500 in which information of channels used by other sources is stored.

Finally, operation 400 of FIG. 2 in which a current channel is switched to a new channel which is not most recently used by other sources through information about channels used by other sources is described.

If a currently used channel of the wireless network 1 which is desired to be used interferes with a frequency used by other sources, there are many methods to allocate a new channel. According to exemplary embodiments, the following two methods may be used.

In an interference avoidance method according to an exemplary embodiment, whether a channel is used by other sources is determined and channel use time is managed, by scanning an energy value variation of each channel at a predetermined period as shown in FIG. 3. If a channel currently used by the wireless network 1 is occupied by a frequency used by other sources, the time when the channel is used is stored. If a currently used channel is occupied by a frequency used by other sources, the current time when the channel is occupied is compared with the stored use time of each channel and the currently used channel is switched to a channel which has least recently been used. The above method is referred to as a time stamp method in which, when a channel is sensed as being used by other sources through ED scan, the sensed time is recorded and used.

Figure 6:
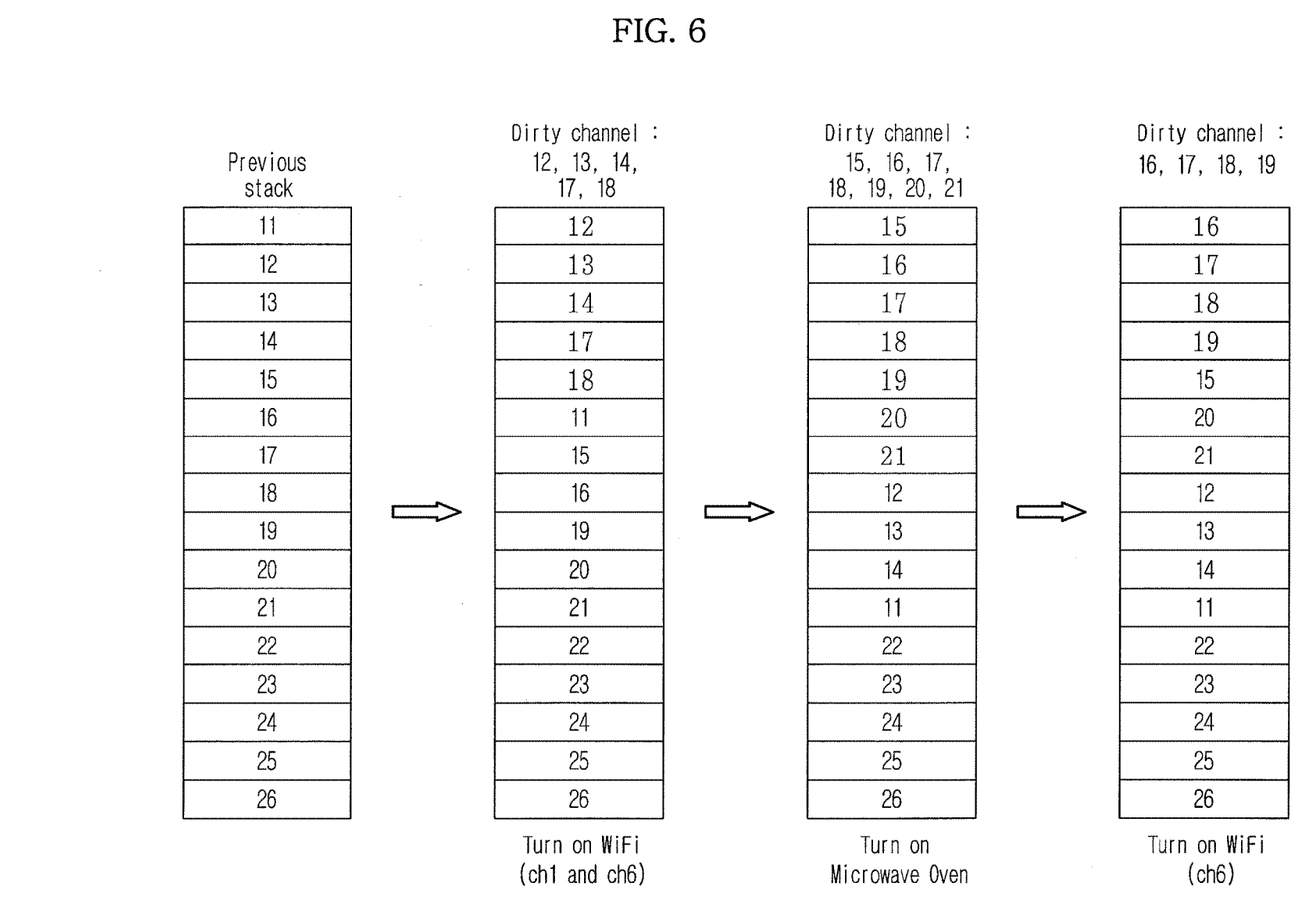
FIG. 6 is a diagram illustrating a wireless network channel allocation method for interference avoidance according to an exemplary embodiment.

An interference avoidance method according to another exemplary embodiment also uses information about a channel sensed as being used by other sources through ED scan. However, if all channels of the wireless network 1 are sensed as being used by other sources, a stack is used when storing the time when a channel is used by other sources, thereby storing an order of channels used by other sources. A process of storing channel information used by other sources using the stack and performing interference avoidance is described with reference to FIG. 6. FIG. 6 is a diagram illustrating a wireless network channel allocation method for interference avoidance according to an exemplary embodiment.

If a value higher than the threshold value which is a predetermined value during ED scan is sensed, a corresponding channel number is eliminated from the stack and is added to the top of the stack. Through repetition of such a process, channel numbers which have not been used for a long time are located to the bottom side of the stack and channel numbers which have been recently used by other sources are located to the upper side of the stack.

The stack shown in FIG. 6 illustrates an example in the case of ZIGBEE communication. In ZIGBEE communication, a used frequency band is generally divided into 16 channels.

The stack of an initial state shown in the leftmost side of FIG. 6 includes channels having channel numbers 11 to 26. Under the state that the wireless network 1 for ZIGBEE communication to be used is enabled, if channels 1 and 6 of a WIFI network as another source operate, an energy value variation may be sensed during ED scan in channel 12, 13, 14, 17, and 18 of the ZIGBEE network by the two WIFI network channels.

As the WIFI channels 1 and 6 of the WIFI network as another source operate in an initial stack state, the stack of the initial state is changed to a state shown in the second stack from the leftmost side. That is, the channels 12, 13, 14, 17, and 18, energy value variations of which are sensed, are temporarily eliminated from the stack and are then added to the top of the stack.

Next, the third stack from the leftmost side shown in FIG. 6 is described. If a microwave oven operates, ZIGBEE channels 15, 16, 17, 18, 19, 20, and 21 are sensed as being used by the microwave oven in the state of the second stack. These channels are eliminated from the stack and added to the top of the stack, thereby forming a state of the third stack.

Next, the fourth stack from the leftmost side shown in FIG. 6 is described. If a WIFI network which is another source operates again in a channel 6, channels 16, 17, 18, and 19 of the ZIGBEE communication network 1 are sensed as being used by the WIFI network in the third stack. These channels are then temporarily eliminated from the stack and added to the top of the stack.

While changing the stack by repeating the above processes, channels which have recently been used by other sources are located to the top side of the stack and channels which have been not used for a long time are located to the bottom side of the stack. If it is determined that a current channel interferes with another source, a channel which is located at the bottommost of the stack is allocated as a new channel.

The above-described wireless network channel allocation method according to the exemplary embodiment discerns channels used by other sources by periodically monitoring communication environments of the wireless network 1 to be used. Accordingly, a channel which is subject to interference may be rapidly switched.

As compared with a conventional wireless network channel allocation method in which a channel is scanned in any order after interference occurs and a channel which is not used by another device is selected, the channel allocation method monitors a state of a channel used by other sources and selects a new channel upon occurrence of interference. Accordingly, it takes less time to switch channels. Since the conventional interference avoidance method selects channels only in consideration of a current wireless state, switching to a channel which was not used during interference check but is frequently used by other sources may occur. If a channel is switched to the channel which is frequently used by other sources, this means that another switching operation to a new channel is needed to avoid interference within a short time.

However, the wireless network channel allocation method for interference avoidance according to the exemplary embodiment uses frequency locality of frequencies of other sources. Therefore, channels which are not to be used not only currently but also in the future may be selected and the number of channel switchings upon occurrence of interference may be decreased compared with the conventional method.

The above-described wireless network channel allocation method for interference avoidance may be executed by one or more devices of the wireless network, including one or more computers or servers or by one or more processors.

The operating method of the processor according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the processor supporting the wireless network channel allocation method for interference avoidance described herein.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A wireless network channel allocation method for interference avoidance in a wireless network which performs communication between devices in a predetermined frequency band including one or more channels, the method comprising:

initially determining, by at least one of the devices, whether some or all of the one or more channels is used by other sources including sources external to the wireless network;

if some or all of the one or more channels is used by other sources, determining whether one of the one or more channels used by other sources is currently used by the wireless network;

if one of the one or more channels used by other sources is currently used by the wireless network, selecting any one of the one or more channels except for the channel which is currently used by the wireless network and switching the channel which is currently used by the wireless network to the selected channel; and if one of the one or more channels used by other sources is not currently used by the wireless network, storing information about the channels used by the other sources, wherein the selected channel is a channel which is not most recently used by other sources according to the stored information, and wherein the determining of whether some or all of the one or more channels are used by other sources includes sensing an energy value variation of each of the one or more channels at a prescribed period;

if a channel, energy value variation of which is equal to or greater than a predetermined value, is sensed, determining that the channel, energy value variation of which is equal to or greater than the predetermined value, is used by other sources; and if a channel, energy value variation of which is less than the predetermined value, is sensed, determining that the channel, energy value variation of which is less than the predetermined value, is not used by other sources.

2. The wireless network channel allocation method of claim 1, wherein the prescribed period is determined according to characteristics of devices communicating in the wireless network.

3. The wireless network channel allocation method of claim 2, wherein the prescribed period varies according to variation in the number of channels having the energy value variation equal to or greater than the predetermined value.

4. The wireless network channel allocation method of claim 2, wherein the storing of information about the channels used by the other sources includes:

storing an order of occurrence of one or more channels used by the other sources.

5. The wireless network channel allocation method of claim 1, wherein the stored information about the channels used by the other sources is times when the one or more channels are used by frequency bands used by other sources, and wherein the selected channel is a channel which is not most recently used by other sources based on the stored information about the channels.

6. The wireless network channel allocation method of claim 1, wherein the stored information about the channels is channel numbers of channels used by other sources.

7. The wireless network channel allocation method of claim 6, wherein the channel numbers are stored in a stack form while being added to a top of a stack in an order of use time of each channel.

8. The wireless network channel allocation method of claim 7, wherein the channel numbers are stacked such that channels which are most recently used by other sources are stacked to a top side of the stack and channels which have least recently been used by other sources are stacked to a bottom side of the stack.

9. The wireless network channel allocation method of claim 8, wherein the selected channel is a channel which is located at the bottommost among channel numbers stored in the stack.

10. The wireless network channel allocation method of claim 1, wherein the wireless network performs communication through a ZIGBEE communication protocol.

11. A computer system, comprising:

a wireless network; and devices coupled to the wireless network, the devices communicating with each other via the wireless network in a predetermined frequency band including one or more channels, wherein at least one of the devices is configured to initially determine a first channel from the one or more channels being used by an external source which is a source external to the wireless network, to store information about the first channel, to select a second channel from the one or more channels, and to switch to the second channel if the first channel is currently used by the wireless network, and wherein the second channel is a channel which is not most recently used by the external source according to the stored information, wherein the at least one of the devices determine whether the first channel is a same channel as the second channel based on an energy value variation of each of the one or more channels at a prescribed period, wherein the determining of whether the first channel is a same channel as the second channel includes sensing an energy value variation of each of the one or more channels at a prescribed period, if a channel, energy value variation of which is equal to or greater than a predetermined value, is sensed, determining that the channel, energy value variation of which is equal to or greater than the predetermined value, is used by other sources, and if a channel, energy value variation of which is less than the predetermined value, is sensed, determining that the channel, energy value variation of which is less than the predetermined value, is not used by other sources.

12. The computer system of claim 11, wherein the prescribed period is determined according to characteristics of the devices communicating in the wireless network.

13. The computer system of claim 12, wherein the prescribed period varies according to a variation in a number of the one or more channels having the energy value variation equal to or greater than a predetermined value.

14. The computer system of claim 12, wherein the at least one of the devices stores an order of occurrence of the one or more channels used by the external source.

* * * * *